US008156133B2

(12) United States Patent
Taber (10) Patent No.: US 8,156,133 B2
(45) Date of Patent: Apr. 10, 2012

(54) MODIFYING AN ELECTRONIC GRAPHICS FILE TO BE SEARCHABLE ACCORDING TO ANNOTATION INFORMATION

(75) Inventor: James E. Taber, Plano, TX (US)

(73) Assignee: Raytheon Company, Waltham, MA (US)

( * ) Notice: Subject to any disclaimer, the term of this patent is extended or adjusted under 35 U.S.C. 154(b) by 374 days.

(21) Appl. No.: 12/353,709

(22) Filed: Jan. 14, 2009

(65) Prior Publication Data

US 2010/0180191 A1  Jul. 15, 2010

(51) Int. Cl.
*G06F 7/00* (2006.01)
*G06F 17/30* (2006.01)
(52) U.S. Cl. .................... 707/758; 707/743; 707/756
(58) Field of Classification Search .................. None
See application file for complete search history.

(56) References Cited

U.S. PATENT DOCUMENTS

| | | | | |
|---|---|---|---|---|
| 6,334,213 | B1 * | 12/2001 | Li | 717/170 |
| 6,356,921 | B1 * | 3/2002 | Kumar et al. | 715/203 |
| 6,690,762 | B1 * | 2/2004 | Berestov | 378/62 |
| 6,859,909 | B1 | 2/2005 | Lerner et al. | |
| 7,092,116 | B2 | 8/2006 | Calaway | |
| 7,409,633 | B2 | 8/2008 | Lerner et al. | |
| 7,675,549 | B1 * | 3/2010 | Brower et al. | 348/211.3 |
| 7,756,892 | B2 * | 7/2010 | Levy | 707/781 |
| 2003/0059113 | A1 * | 3/2003 | Walton et al. | 382/180 |
| 2005/0001909 | A1 | 1/2005 | Okisu et al. | |
| 2005/0010562 | A1 | 1/2005 | Nagasaka | |
| 2006/0004914 | A1 * | 1/2006 | Kelly et al. | 709/219 |
| 2006/0022986 | A1 | 2/2006 | LinneVonBerg et al. | |
| 2006/0212794 | A1 | 9/2006 | Evans et al. | |
| 2007/0038458 | A1 * | 2/2007 | Park | 704/270 |
| 2007/0053004 | A1 | 3/2007 | Calaway | |
| 2007/0234286 | A1 | 10/2007 | Huang et al. | |
| 2007/0293265 | A1 | 12/2007 | Fei et al. | |
| 2008/0016102 | A1 * | 1/2008 | Albornoz et al. | 707/102 |
| 2008/0065681 | A1 * | 3/2008 | Fontijn et al. | 707/102 |
| 2010/0088239 | A1 * | 4/2010 | Blair et al. | 705/80 |

OTHER PUBLICATIONS

Unknown, "Distributed Common Ground System (DCGS) Block 10.2 Upgrade Program," Integrating ISR Assets for Battlespace Dominance, Raytheon White Paper, two pages, © 2007.
Unknown, "RemoteView Professional for Windows," Overwatch Textron Systems, RemoteView Pro, retrieved from http://www.sensor.com/ow_prod_rvpro_win.html, two pages, Printed Apr. 24, 2009.
Unknown, "SOCET GXP downloads," What is SOCET GXP? BAE, Systems—Geospatial eXploitation Products, retrieved from http://www.socetgxp.com/docs/education/white_papers/wp_see_20070912.pdf, 14 pages, Dated Sep. 12, 2007 Printed Apr. 24, 2009.

* cited by examiner

*Primary Examiner* — Kuen Lu
*Assistant Examiner* — Jessica N Le
(74) *Attorney, Agent, or Firm* — Schwegman, Lundberg & Woessner, P.A.

(57) ABSTRACT

In certain embodiments, a method for locating an electronic graphics file stored in a database includes extracting from an electronic graphics file, the electronic graphics file including a first and a second header, the first header of the electronic graphics file being searchable, information corresponding to electronic graphics file annotations stored in the second header of the electronic graphics file. The method further includes storing at least a portion of the extracted information corresponding to electronic graphics file annotations in the first header of the electronic graphics file to form an annotations-searchable version of the electronic graphics file, the annotations-searchable version of the electronic graphics file being searchable according to at least a portion of the information corresponding to electronic graphics file annotations stored in the first header of the electronic graphics file.

20 Claims, 4 Drawing Sheets

MODIFYING AN ELECTRONIC GRAPHICS FILE TO BE SEARCHABLE ACCORDING TO ANNOTATION INFORMATION

TECHNICAL FIELD

This invention relates generally to data processing and more particularly to modifying an electronic graphics file to be searchable according to annotation information.

BACKGROUND

Electronic graphics files generally include an electronic representation of an image. A collection of electronic graphics files may be stored in a database or other suitable memory module. It may be desirable to search a collection of electronic graphics files for particular electronic graphics files based on particular search parameters.

SUMMARY

According to the present invention, disadvantages and problems associated with previous techniques for searching for particular electronic graphics files may be reduced or eliminated.

In certain embodiments, a method for locating an electronic graphics file stored in a database includes extracting from an electronic graphics file, the electronic graphics file including a first and a second header, the first header of the electronic graphics file being searchable, information corresponding to electronic graphics file annotations stored in the second header of the electronic graphics file. The method further includes storing at least a portion of the extracted information corresponding to electronic graphics file annotations in the first header of the electronic graphics file to form an annotations-searchable version of the electronic graphics file, the annotations-searchable version of the electronic graphics file being searchable according to at least a portion of the information corresponding to electronic graphics file annotations stored in the first header of the electronic graphics file.

Certain embodiments of the present invention may provide one or more technical advantages. Conventional techniques for locating an electronic graphics file stored in a database do not allow for a search based on information corresponding to electronic graphics file annotations associated with the electronic graphics file because the annotation information is stored in a header of the electronic graphics file that is non-searchable using standard electronic graphics file query tools. Extracting the text portion of the annotation information from the non-searchable header and storing the text portion of the annotation information in a header that is searchable using standard electronic graphics file query tools may allow a user to locate electronic graphics files stored in a database based on the annotation information associated with the electronic graphics file. Thus, the present invention may increase the flexibility of a user seeking to locate particular electronic graphics files stored in an electronic graphics file database by adding an additional parameter by which the files may be located.

As a particular example, in a national defense context, an image analyst may seek to transform a number of electronic graphics files into actionable intelligence. In order for the image analyst to transform electronic graphics files into actionable intelligence, the image analyst may seek to locate the electronic graphics files stored in an electronic graphics file database based on at least some of the annotation information associated with the electronic graphics files (e.g., the annotation information may indicate some important feature of the electronic graphics files). For example, an image analyst seeking to extract target information from high resolution aerial photographs stored in a database may seek to locate the high resolution aerial photographs stored in the database having associated annotation information with a text portion including the word "target." Certain embodiments of the present invention may allow the image analyst to perform a text search for the word "target" of the annotation information associated with electronic graphics files stored in an electronic graphics file database such that all high resolution aerial photographs having an annotation with a text portion including the word "target." may be quickly located (rather than manually searching the annotations associated with each high resolution photograph). As a result, certain embodiments of the present invention may reduce the time it takes to transform electronic graphics files into actionable intelligence, thereby increasing the ability to get inside an adversaries decision loop.

Certain embodiments of the present invention may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figure 1:
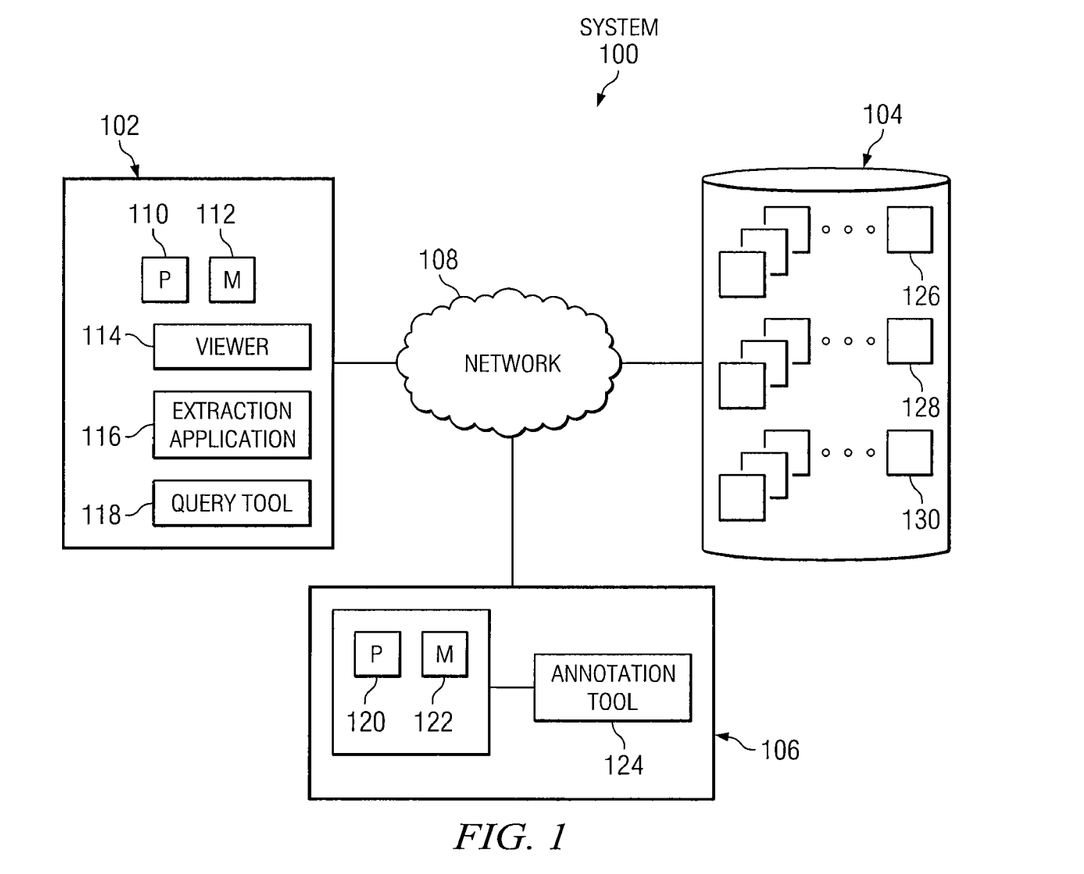
FIG. 1 illustrates an example system for modifying an electronic graphics file to be searchable according to annotation information, according to certain embodiments of the present invention.

FIG. 1 illustrates an example system 100 for modifying an electronic graphics file to be searchable according to annotation information, according to certain embodiments of the present invention. System 100 may include one or more user systems 102, one or more electronic graphics file databases 104, one or more annotation systems 106, and a network 108. Although this particular implementation of system 100 is illustrated and primarily described, the present invention contemplates any suitable implementation of system 100 according to particular needs.

In general, system 100 is operable to modify electronic graphics files to be searchable according to at least some of the annotation information associated with the electronic graphics files by extracting the annotation information from a non-searchable electronic graphics file header and storing that extracted annotation information in a searchable electronic graphics file header. For example, in the national defense context, in order for an image analyst to transform electronic graphics files into actionable intelligence, the image analyst may seek to locate electronic graphics files stored in an electronic graphics file database based on at least some of the annotation information associated with the electronic graphics files (e.g., the annotation information may indicate some important feature of the electronic graphics files).

Furthermore, an electronic graphics file may include at least a first header (searchable using standard electronic graphics file query tools) and a second header (non-searchable using standard electronic graphics file query tools), annotation information associated with the electronic graphics file being stored in the second non-searchable header. Certain embodiments of the present invention may help reduce the time it takes to transform the electronic graphics files into actionable intelligence by extracting at least some of the annotation information from the second non-searchable electronic graphics file header and storing that extracted annotation information in the first searchable electronic graphics file header such that the graphics file is searchable according to at least some of the annotation information associated with the electronic graphics file.

User systems 102, electronic graphics file databases 104, and annotation systems 106 may be physically distributed, being in different locations geographically remote from one other, or logically distributed, being at approximately the same location as one another. Furthermore, although user systems 102, electronic graphics file databases 104, and annotation systems 106 are illustrated and primarily described as being separate, it is understood that the systems and the functionality associated with the systems may be included in a single system. For simplicity, one or more user systems 102, one or more electronic graphics file databases 104, and one or more annotation systems 106 of system 100 will each be referred to primarily in the singular throughout the remainder of this description.

User system 102 and annotation system 106 may be coupled to one or more electronic graphics file databases 104 via network 108. Network 108 facilitates wireless or wireline communication. Network 108 may communicate, for example, IP packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations.

Electronic graphics file database 104 of system 100 may include any memory or database module and may take the form of volatile or non-volatile memory, including, without limitation, magnetic media, optical media, random access memory (RAM), read-only memory (ROM), removable media, or any other suitable local or remote memory component. In certain embodiments, electronic graphics file database 104 includes one or more SQL servers.

Electronic graphics file database 104 may store a number of electronic graphics files. Each electronics graphics file stored in electronic graphics file database 104 may include at least two headers storing information, such as metadata, associated with the electronic graphics file. More particularly, each electronic graphics file stored in electronic graphics file database 104 may include a first file header that is searchable using standard electronic graphics file query tools and a second header that is non-searchable using standard electronic graphics file query tools.

In certain embodiments, electronic graphics file database 104 stores one or more raw electronic graphics files 126, one or more annotated electronic graphics file 128, and one or more annotations-searchable electronic graphics files 130. Although electronic graphics file database 104 is depicted and primarily described as storing each of raw electronic graphics files 126, annotated electronic graphics file 128, and annotations-searchable electronic graphics files 130, electronic graphics file database 104 may not store each of theses types of electronic graphics files.

Annotated electronic graphics files 128 may be versions of the corresponding raw electronic graphics files 126 to which annotations have been added, as described in more detail below in connection with annotation system 106. Annotations-searchable electronic graphics files 130 may be versions of corresponding annotated electronic graphics files that have been processed by extraction application 116 of user system 102, as described in more detail below.

In certain embodiments, the electronic graphics files stored in graphics file database 104 are high-resolution electronic graphics files. As a particular example, electronic graphics files stored in electronic graphics file database 104 may be National Imagery Transmission Format (NITF) files, the NITF files having a first header (NITF header) that is searchable using standard electronic graphics file query tools and a second header (graphics segment sub-header) that is non-searchable using standard electronic graphics file query tools. More particularly, in the national defense context, the NITF files may correspond to high resolution aerial photographs taken by a camera aboard a surveillance aircraft. The first header of the NITF file (NITF header) may include timestamp information, geolocation information, information related to the type of image (e.g., the resolution, whether the image is in color of black and white), and information related to the platform from which the image came (e.g., the particular aircraft that took the image). The second header of NITF file (graphics segment sub-header) may include information associated with electronic graphics file annotations added to the file by annotation system 106, as described in further detail below.

In certain embodiments, system 100 includes an annotation system 106. Annotation system 106 may include any appropriate input devices (such as a keypad, touch screen, mouse, or other device that can accept information), output devices, mass storage media, or other suitable components for receiving, processing, storing, and communicating data. Both the input device and output device may include fixed or removable storage media such as a magnetic computer disk, CD-ROM, or other suitable media to both receive input from and provide output to a user of annotation system 106. Annotation system 106 may include a personal computer, workstation, network computer, kiosk, wireless data port, personal data assistant (PDA), Smart Phone, one or more processors within these or other devices, or any other suitable processing device.

Annotation system 106 may include a processing module 120, a memory module 122, and an annotation tool 124. Processing module 120 may include one or more microprocessors, controllers, or any other suitable computing devices or resources. Processing module 120 may work, either alone or with other components of system 100, to provide the functionality of system 100 described herein. Memory module 112 may take the form of volatile or non-volatile memory including, without limitation, magnetic media, optical media, random access memory (RAM), read-only memory (ROM), removable media, or any other suitable memory component.

"Annotation system 106" and "user of annotation system 106" may be used interchangeably. A user of annotation system 102 may include, for example, a human user or a computer program or other suitable software module for automatically interacting with annotation system 106. A particular example user of annotation system 106 includes an image analyst.

Annotation tool 124 of annotation system 106 may be operable to access files such as raw electronic graphics files 126 stored in electronic graphics file database 104. Annotation tool 124 may allow a user of annotation system 106 to add annotation information to the raw electronic graphics file 126. The annotation information may include any suitable combination of text and non-text information. The annotation information added to the raw electronic graphics file 126 with annotation tool 124 may be stored in the second header of raw electronic graphics file 126. Raw electronic graphics file 126 may then be stored in electronic graphics file database 104 as annotated electronic graphics file 128, annotated electronic graphics file 128 including the annotations added to the raw electronic graphics file 126 stored in the second header. Annotated electronic graphics file 128 may either replace the corresponding raw electronic graphics file 126 or be stored in addition to the corresponding raw electronic graphics file 126.

As a particular example, the accessed raw electronic graphics file 126 may be a NITF file corresponding to a high resolution aerial photograph taken by a camera aboard a surveillance aircraft (as described above). A user of annotation system 106 (e.g., an image analyst) may use annotation tool 124 to add annotation information to the NITF file. As an example, the annotation information may include both non-text information (e.g., a circled portion of the photograph corresponding to a particular structure) and text information (e.g., the word "target"). The annotation information added to a NITF file may be stored in the second header (graphics segment sub-header) of the NITF file.

In certain embodiments, system 100 includes user system 102. User system 102 may include any appropriate input devices (such as a keypad, touch screen, mouse, or other device that can accept information), output devices, mass storage media, or other suitable components for receiving, processing, storing, and communicating data. Both the input device and output device may include fixed or removable storage media such as a magnetic computer disk, CD-ROM, or other suitable media to both receive input from and provide output to a user of user system 102. User system 102 may include a personal computer, workstation, network computer, kiosk, wireless data port, PDA, Smart Phone, one or more processors within these or other devices, or any other suitable processing device.

User system 102 may include a processing module 110, a memory module 112, a viewer 114, an extraction application 116, and an query tool 118. Processing module 110 may include one or more microprocessors, controllers, or any other suitable computing devices or resources. Processing module 110 may work, either alone or with other components of system 100, to provide the functionality of system 100 described herein. Memory module 112 may take the form of volatile or non-volatile memory including, without limitation, magnetic media, optical media, random access memory RAM, ROM, removable media, or any other suitable memory component.

"User system 102" and "user of user system 102" may be used interchangeably. A user of user system 102 may include, for example, a human user or a computer program or other suitable software module for automatically interacting with user system 102. An example user of user system 102 includes an image analyst.

Viewer 114 of user system 102 may be operable to permit a user of user system 102 to access and view electronic graphics files (e.g., raw electronic graphics files 126, annotated electronic graphics files 128, and annotations-searchable electronic graphics file 130 stored in electronic graphics file database 104) by way of any appropriate output device operable to convey information associated with the accessed electronic graphics file, including digital data, visual information, or any other suitable information. For example, viewer 114 may be REMOTEVIEW manufactured by OVERWATCH SYSTEMS, SOCETGXP manufactured by BAE SYSTEMS, a simple WINDOWS image viewer, or any other suitable Electronic Light Table or other suitable viewer operable to permit a user of user system 102 to access and view electronic graphics files.

Extraction application 116 of user system 102 may be operable to access an electronic graphics file (e.g., an annotated electronic graphics file 128 stored in electronic graphics file database 104) and process the accessed electronic graphics file by extracting at least some of the information stored in the second header of the electronic graphics file and storing at least a portion of the extracted information in the first header of the electronic graphics file. Extraction application 116 may operate as a batch process (i.e., extraction application 116 automatically processes a number of graphics files stored in graphics file database 104), in response to a request from a user of user system 102 (i.e., extraction application 116 processes a particular electronic graphics file stored in graphics file database 104 in response to the selection of that file by a user of user system 102), or in any other suitable manner.

In certain embodiments, extraction application 116 is operable to access an annotated electronic graphics file 128 stored in electronic graphics file database 104 and determine whether the accessed annotated electronic graphics file 128 is of a proper type for extraction (e.g., determine whether the accessed annotated electronic graphics file 128 is of a type having at least a first header and a second header). Having determined that the electronic graphics file is of the proper type for extraction, extraction application 116 may be further operable to extract at least some of the information stored in the second header of the annotated electronic graphics file 128, the extracted information including at least some of the annotation information associated with the annotated electronic graphics file 128.

Extraction application 116 may extract at least some of the information stored in the second header of the annotated electronic graphics file 128 by building segment objects representing the various components of the annotated electronic graphics file 128, separating the segment object including the second header into text type and non-text type data, and extracting the text bytes corresponding to the text-type information from the segment object including the second header. Extraction application 116 may then convert the text bytes to strings and package the strings. Extraction application 116 may use the packaged text strings to create a tagged record extension (TRE) and write the TRE into the first header of the electronic graphics file. Extraction application 116 may be further operable to store the processed annotated electronic graphics file 128 as an annotations-searchable electronic graphics file 130 in electronic graphics file database 104. Annotations-searchable electronic graphics file 130 may replace either or both of the corresponding raw electronic graphics file 126 and the corresponding annotated electronic graphic file 128, or be stored in addition to these corresponding electronic graphics files.

As a result of the above-described example extraction process performed by extraction application 116, annotations-searchable electronic graphics files 130 include text-type annotation information in the first header, which is searchable using standard electronic graphics file query tools (e.g., query tool 118 associated with user system 102, as described below).

As a particular example, in the national defense context, the annotated graphics file 128 accessed by extraction application 116 may be a NITF file corresponding to a high resolution aerial photograph having annotation information that corresponds to a circled portion of the photograph corresponding to a particular structure and the word "target." In response to accessing the NITF file, extraction application 116 may determine that the accessed NITF file is of a proper type for extraction, as a NITF file has a first header (NITF header) and a second header (graphics segment sub-header).

In response to determining that the NITF file is of the proper type for extraction, extraction application 116 may build segment objects representing the various components of the NITF file (i.e., NITF header, graphics segment, data segment), separate the segment object including the second header (i.e., the graphics segment including the graphics segment sub-header) into text-type (including the word "target") and non-text type data (including the circle), and extract the text bytes corresponding to the text-type information from the segment object including the second header (e.g., the graphics segment sub-header). Extraction application 116 may then convert the text bytes to strings and package the strings. Extraction application 116 may use the text strings to create a TRE, write the TRE into the first header of the NITF file (such that the first header would include the word "target"), and store the processed NITF file in database 104.

Although a particular text extraction technique is primarily described, the present invention contemplates any suitable text extraction technique for storing at least a portion of the information stored in a non-searchable second header of the electronic graphics file in a first searchable header of the electronic graphics file, according to particular needs. Furthermore, although extraction application 116 is depicted and primarily described as being included in user system 102, extraction application 116 may operate at any suitable point within system 100 according to particular needs. For example, system 100 may be configured such that extraction application 116 processes annotated electronic graphics files 128 as a user of annotation system 106 stores the annotated electronic graphics file 128 in the electronic graphics file database 104.

Query tool 118 of user system 102 may allow a user of user system 102 to locate raw electronic graphics files 126, annotated electronic graphics files 128, and/or annotations-searchable electronic graphics file 130 stored in graphic file database 104 based on a text search of information included in the first headers of the electronic graphics files. Query tool 118 may be a standard electronic graphics file query tool such as QUICK QUERY, RAYTHEON Distributed Common Ground System (DCGS), a Geospatial and Imagery Access Services (GIAS) specification compliant query tool, any suitable SQL-based search tool, or any other suitable query tool operable to conduct text searches of the first headers of electronic graphics files.

As described above, annotations-searchable electronic graphics files 130 (e.g., annotated electronic graphics files 128 that have been processed by extraction application 116, as described above) include text-type annotation information stored in the first header of the file. Because query tool 118 allows a user of user system 102 to locate an electronic graphics file based on a text search of information included in the first header of the electronic graphics file, a user of user system 102 may use query tool 118 to locate annotations-searchable electronic graphics file 130 stored in electronic graphics file database 104 based on annotation information associated with the file.

FIG. 1 merely provides one example of computers that may be used with the invention. The present invention contemplates computers other than general purpose computers as well as computers without conventional operating systems. As used in this document, the term "computer" is intended to encompass a personal computer, workstation, network computer, a portable computing device, or any other suitable processing device. Furthermore, each computer system of system 100 may include one or more processing modules and one or more memory modules. A processing module may include one or more microprocessors, controllers, or any other suitable computing devices or resources. Processing modules may work, either alone or with other components of system 100, to provide the functionality of system 100 described herein. Each memory module may take the form of volatile or non-volatile memory including, without limitation, magnetic media, optical media, RAM, ROM, removable media, or any other suitable memory component.

Although a particular number components of system 100 have been illustrated and primarily described, the present invention contemplates system 100 including any suitable number of such components. Furthermore, the various components of system 100 described above may be local or remote from one another and may be implemented in any suitable combination of hardware, firmware, and software.

In operation of an example embodiment of system 100, extraction application 116 accesses an electronic graphics file (e.g., an annotated electronic graphics file 128). Extraction application 116 then determines whether the accessed electronic graphics file is of the proper type for processing. For example, extraction application 116 may determine whether the accessed electronic graphics file includes at least a first header and a second header.

If extraction application 116 determines that the accessed electronic graphics file is not of the proper type (e.g., that the electronic graphics file does not have at least a first header and a second header, such as may be the case with a JPEG file), the another electronic graphics file may be accessed. If extraction application 116 determines that the accessed electronic graphics file is of the proper type (e.g., that the accessed electronic graphics file has at least a first header and a second header), extraction application 116 may extract the at least a portion of the information stored in the second header of the electronic graphics file. As described above, the information stored in the second header of the electronic graphics file may include the annotation information associated with the file (e.g., when the accessed electronic graphics file is an annotated electronic graphics file 128).

Extraction application 116 may extract at least some of the information stored in the second header of the annotated electronic graphics file 128 by building segment objects representing the various components of the annotated electronic graphics file 128, separating the segment object including the second header into text type and non-text type data, and extracting the text bytes corresponding to the text-type information from the segment object including the second header. Extraction application 116 may then convert the text bytes to strings and package the strings. Extraction application 116 may use the text strings to create a TRE, write the TRE into the first header of the electronic graphics file, and store the processed electronic graphics file in database 104.

Certain embodiments of the present invention may provide one or more technical advantages. Conventional techniques for locating an electronic graphics file stored in a database do not allow for a search based on information corresponding to electronic graphics file annotations associated with the electronic graphics file because the annotation information is stored in a header of the electronic graphics file that is non-searchable using standard electronic graphics file query tools. Extracting the text portion of the annotation information from the non-searchable header and storing the text portion of the annotation information in a header that is searchable using standard electronic graphics file query tools may allow a user to locate electronic graphics files stored in a database based on the annotation information associated with the electronic graphics file. Thus, the present invention may increase the flexibility of a user seeking to locate particular electronic graphics files stored in an electronic graphics file database by adding an additional parameter by which the files may be located.

As a particular example, in a national defense context, an image analyst may seek to transform a number of electronic graphics files into actionable intelligence. In order for the image analyst to transform electronic graphics files into actionable intelligence, the image analyst may seek to locate the electronic graphics files stored in an electronic graphics file database based on at least some of the annotation information associated with the electronic graphics files (e.g., the annotation information may indicate some important feature of the electronic graphics files). For example, an image analyst seeking to extract target information from high resolution aerial photographs stored in a database may seek to locate the high resolution aerial photographs stored in the database having associated annotation information with a text portion including the word "target." Certain embodiments of the present invention may allow the image analyst to perform a text search for the word "target" of the annotation information associated with electronic graphics files stored in an electronic graphics file database such that all high resolution aerial photographs having an annotation with a text portion including the word "target." may be quickly located (rather than manually searching the annotations associated with each high resolution photograph). As a result, certain embodiments of the present invention may reduce the time it takes to transform electronic graphics files into actionable intelligence, thereby increasing the ability to get inside an adversaries decision loop.

Figure 2:
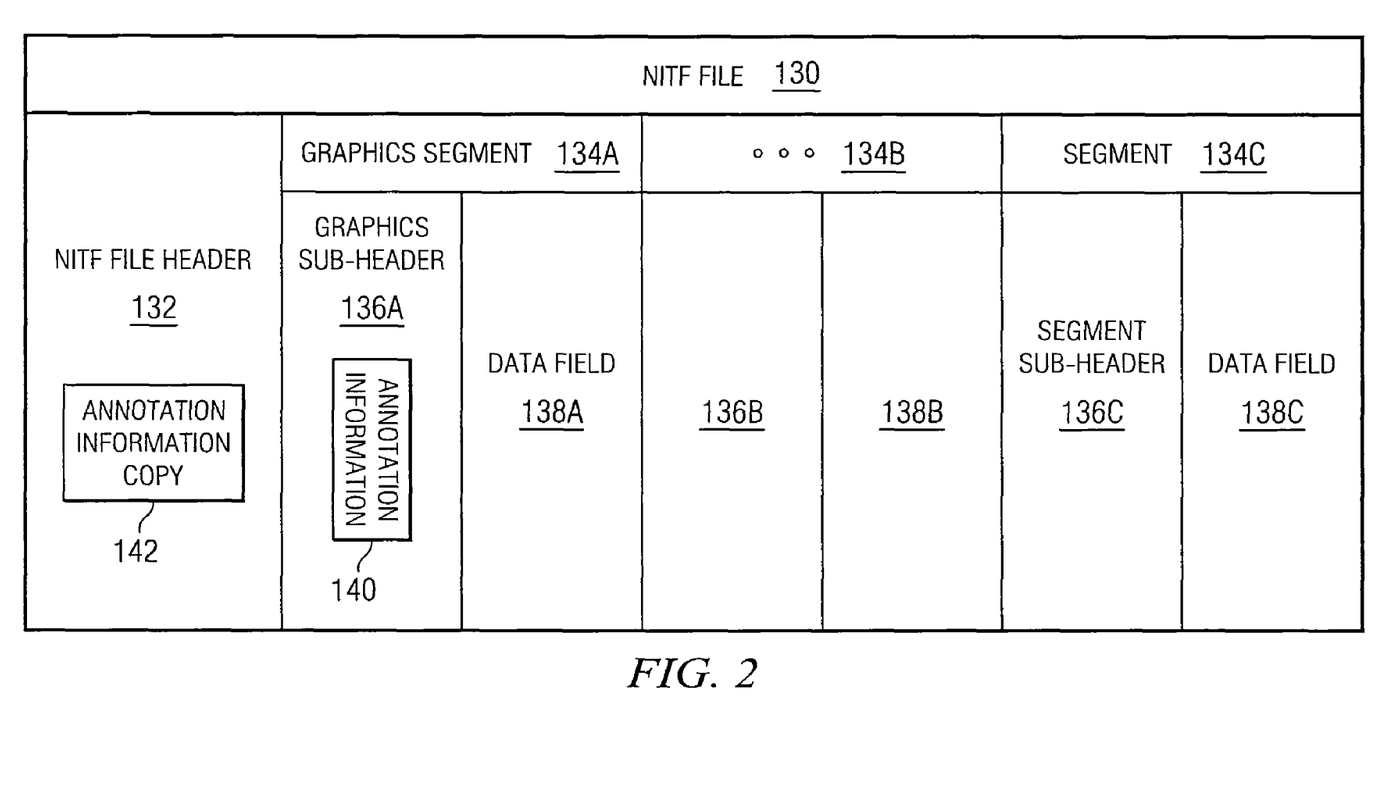
FIG. 2 illustrates an example annotations-searchable electronic graphics file, according to certain embodiments of the present invention.

FIG. 2 illustrates an example annotations-searchable electronic graphics file 130, according to certain embodiments of the present invention. More particularly, FIG. 2 illustrates example embodiment in which annotations-searchable electronic graphics file 130 is a NITF file.

Annotations-searchable electronic graphics file 130 comprises a searchable first header 132 (i.e., NITF file header) and a number of file segments 134 for storing information associated with the file, each file segment 134 having an associated header 136 and an associated segment data field 138. More particularly, annotations-searchable electronic graphics file 130 includes at least a first segment 134A (i.e., NITF file graphics segment) having a second header 136A (i.e., NITF file graphics sub-header).

Annotation information 140 added to a raw electronic graphics file 126 (added by annotation tool 124 as described above) is stored second header 136A (i.e., NITF file graphics segment sub-header), and the raw electronic graphics file 126 is stored in electronic graphics file database 104 as annotated electronic graphics file 128. The text portion of annotation information 140 stored in second header 136A may be extracted by extraction application 116 to create annotation information copy 142. Annotation information copy 142 may be stored in first header 132 (i.e., NITF file header) of annotated electronic graphics file 128, and the annotated electronic graphics file 128 may be stored in electronic graphics file database 104 as annotations-searchable electronic graphics file 130. Because first header 132 is searchable using query tool 118 of user system 102, a user of user system 102 may locate annotations-searchable electronic graphics file 130 using query tool 118 based upon text-type information included in annotation information 140 (as the text-type information of annotation information 140 is stored as annotation information copy 142 in first header 132).

Figure 3:
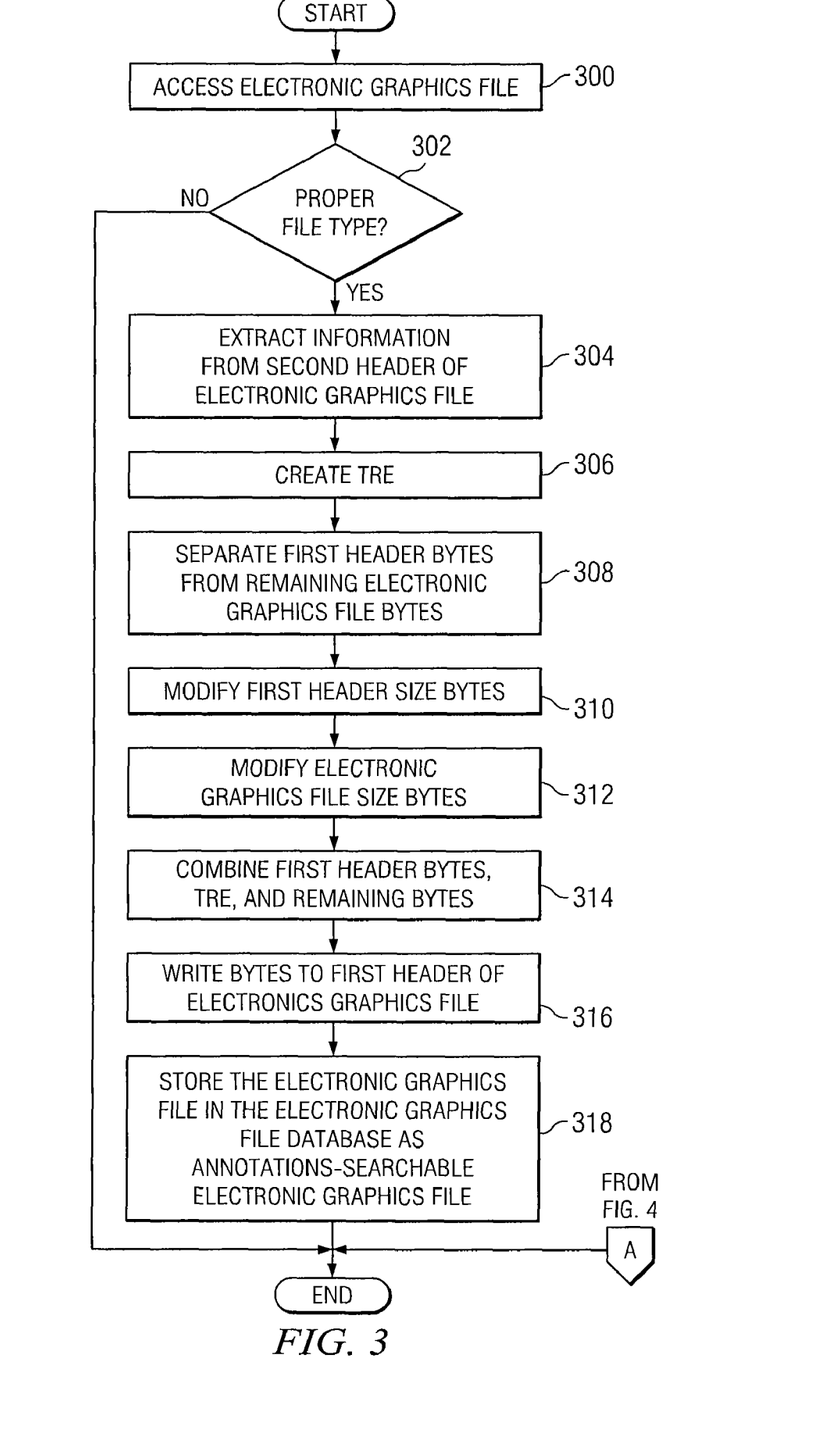
FIG. 3 illustrates an example method for modifying an electronic graphics file to be searchable according to annotation information, according to certain embodiments of the present invention.

FIG. 3 illustrates an example method for modifying an electronic graphics file to be searchable according to annotation information, according to certain embodiments of the present invention. At step 300, extraction application 116 accesses an electronic graphics file (e.g., an annotated electronic graphics file 128). The accessed electronic graphics file may be accessed by extraction application 116 as part of a batch process, at the request of a user of user system 102, or in any other suitable manner. At step 302, extraction application 116 determines whether the accessed electronic graphics file is of the proper type for processing. For example, extraction application 116 may determine whether the accessed electronic graphics file includes at least a first header and a second header.

If extraction application 116 determines at step 302 that the accessed electronic graphics file is not of the proper type (e.g., that the electronic graphics file does not have at least a first header and a second header, such as may be the case with a JPEG file), the method for modifying an electronic graphics file to be searchable according to annotation information ends. If extraction application 116 determines at step 302 that that the accessed electronic graphics file is of the proper type (e.g., that the accessed electronic graphics file has at least a first header and a second header), then the method proceeds to step 304.

Steps 304-306 illustrate an example method for extracting from an electronic graphics file information corresponding to electronic graphics file annotations stored in the second header of the electronic graphics file. Although particular steps 304-306 are illustrated and primarily described, the present invention contemplates any suitable steps for extracting from an electronic graphics file information corresponding to electronic graphics file annotations stored in the second header of the electronic graphics file.

At step 304, extraction application 116 extracts at least a portion of the information stored in the second header of the electronic graphics file. As described above, the information stored in the second header of the electronic graphics file may include annotation information associated with the file (e.g., when the accessed electronic graphics file is an annotated electronic graphics file 128). A more detailed description of an example method for extracting at least a portion of the information stored in the second header of the electronic graphics file as performed by extraction application 116 at step 304 is described below in connection with FIG. 4. At step 306, extraction application 116 uses the information extracted from the second header of the electronic graphics file to create the TRE. As a particular example, extraction application 116 may use the Profile for Imagery Archive Products (PIAPRC) to store the information extracted from the second header to create the TRE.

Steps 308-316 illustrate a method for storing at least a portion of the extracted information corresponding to electronic graphics file annotations (information extracted in steps 304-306, discussed above) in the first header of the electronic graphics file to form an annotations-searchable version of the electronic graphics file. Although particular steps 308-316 are illustrated and primarily described, the present invention contemplates any suitable steps for storing at least a portion of the extracted information corresponding to electronic graphics file annotations in the first header of the electronic graphics file to form an annotations-searchable version of the electronic graphics file.

At step 308, extraction application 116 separates the bytes corresponding to the first header of the electronic graphics file from the remaining bytes of the electronic graphics file (those bytes not corresponding to the first header). At step 310, extraction application 116 modifies the first header size bytes of the electronic graphics file. At step 312, extraction application 116 modifies the size bytes of the electronic graphics file. At step 314, extraction application 116 combines the bytes corresponding to the first header of the electronic graphics file with the TRE (including the information extracted from the second header) and the remaining bytes from the electronic graphics file. At step 316, extraction application 116 writes the bytes corresponding to the first header of the electronic graphics file, the TRE, and the remaining bytes combined in step 314 to the first header of the electronic graphics file.

At step 318, the electronic graphics file is stored in electronic graphics file database 104 as an annotations-searchable electronic graphics file 130. As discussed above, annotations-searchable electronic graphics file 130 may be stored in electronic graphics file database 104 in addition to or in place of annotated electronic graphics file 128.

Figure 4:
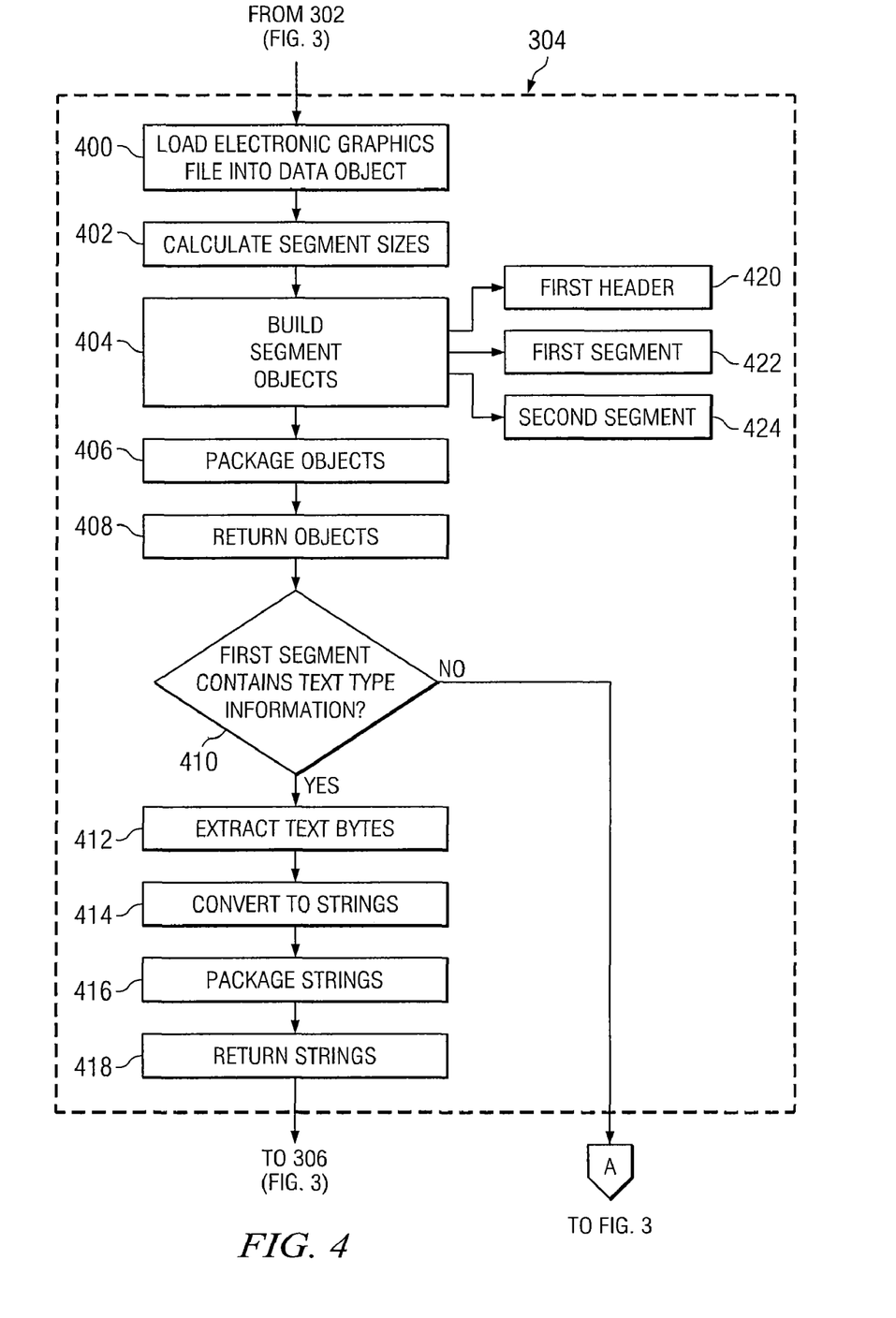
FIG. 4 illustrates an example method for extracting at least a portion of the information stored in the second header of the electronic graphics file, according to certain embodiments of the present invention.

FIG. 4 illustrates an example method for extracting at least a portion of the information stored in the second header of the electronic graphics file (as performed by extraction application 116 at step 304, described above in connection with FIG. 3), according to certain embodiments of the present invention. At step 400, extraction application 116 loads the electronic graphics file into a data object. At step 402, extraction application 116 calculates electronic graphics file segment sizes.

At step 404 extraction application 116 builds electronic graphics file segment objects. The electronic graphics file segment objects represent the various components of the electronic graphics file, including, for example, a first header 420 (e.g., first header 132 described above with respect to FIG. 2), a first segment 422 (e.g., first segment 134A described above with respect to FIG. 2), and a second segment 424. First segment 422 may include a second header (e.g., second header 136A described above with respect to FIG. 2) storing annotation information associated with the electronic graphics file (e.g., when the accessed electronic graphics file is an annotated electronic graphics file 128). As a particular example, the accessed electronic graphics file may be a NITF file including a NITF header (i.e., first header 420), a graphic segment (i.e., first segment 422) having an associated graphics segment sub-header (second header) storing information related to graphics file annotations, and an image segment (i.e., second segment 424) storing image data. At step 406, extraction application 116 packages each of the electronic graphics file segment objects, the packaged electronic graphics file segment objects being returned at step 408.

At step 410, extraction application 116 determines if first segment 422 (segment object including the second header) includes text-type information. Because annotation information associated with the electronic graphics file (e.g., when the accessed electronic graphics file is an annotated electronic graphics file 128) is stored in the second header of the electronic graphics file, text-type information in first segment 422 (segment object including the second header) will include text-type information corresponding to graphics file annotations.

If extraction application 116 determines at step 410 that first segment 422 does not include text-type information (i.e., the electronic graphics file does not have annotations having text-type information), the method for modifying an electronic graphics file to be searchable according to annotation information ends (as depicted in FIG. 3). If extraction application 116 determines at step 410 that first segment 422 does include text-type information, the method proceeds to step 412. At step 412, extraction application 116 separates first segment 422 into text-type and non-text-type data and extracts the text bytes corresponding to the text-type data from first segment 422. At step 414, extraction application 116 converts the extracted text bytes to strings. At step 416 extraction application packages the strings. At step 418, extraction application 116 returns the packaged strings, and the method for modifying the electronic graphics file to be searchable according to annotation information continues at step 306 (depicted in FIG. 3).

Although particular electronic graphics file segments have been depicted and primarily described, the present invention contemplates the processing of a graphics file including any number of suitable segments Furthermore, although a particular method for extracting text from the second header of an electronic graphics file header is depicted and primarily described, the present invention contemplates any suitable method for extracting text from the second header of an electronic graphics file header.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for locating an electronic graphics file stored in a database, comprising:

extracting from an electronic graphics file, the electronic graphics file comprising a first and a second header, the first header of the electronic graphics file being searchable, information corresponding to electronic graphics file annotations stored in the second header of the electronic graphics file; and storing at least a portion of the extracted information corresponding to electronic graphics file annotations in the first header of the electronic graphics file to form an annotations-searchable version of the electronic graphics file, the annotations-searchable version of the electronic graphics file being searchable according to at least a portion of the information corresponding to electronic graphics file annotations stored in the first header of the electronic graphics file.

2. The method of claim 1, wherein:

the annotations-searchable version of the electronic graphics file is stored in a database storing a plurality of annotations-searchable versions of electronic graphics files each having corresponding first and second headers and information corresponding to electronic graphics file annotations stored in the corresponding first headers; and the method comprises:
- receiving a graphics file search request comprising one or more parameters; and
- searching the first headers of the annotations-searchable versions of the electronic graphics files stored in the database based on at least some of the one or more parameters.

3. The method of claim 2, wherein the searching is conducted using a standard electronic graphics query tool.

4. The method of claim 1, wherein the first header of the annotations-searchable version of the electronic graphics file is searchable using standard graphics query tools and the second header of the annotations-searchable version of the electronic graphics file is not searchable using standard graphics query tools.

5. The method of claim 1, wherein the electronic graphics file is a high resolution image.

6. The method of claim 5, wherein the high resolution image is a National Imagery Transmission Format (NITF) image.

7. The method of claim 1, wherein extracting the information corresponding to the electronic graphics file annotations comprises:
- extracting all information corresponding to electronic graphics file annotations from the second header of the electronic graphics file; and
- determining which of the information comprises text information.

8. The method of claim 1, wherein storing at least a portion of the extracted information corresponding to electronic graphics file annotations in the first header of the electronic graphics file to form a annotations-searchable version of the electronic graphics file comprises replacing the electronic graphics file.

9. A system for locating an electronic graphics file stored in a database, comprising:
- one or more processing units operable to:
  - extract from an electronic graphics file, the electronic graphics file comprising a first and a second header, the first header of the electronic graphics file being searchable, information corresponding to electronic graphics file annotations stored in the second header of the electronic graphics file; and
  - store at least a portion of the extracted information corresponding to electronic graphics file annotations in the first header of the electronic graphics file to form an annotations-searchable version of the electronic graphics file, the annotations-searchable version of the electronic graphics file being searchable according to at least a portion of the information corresponding to electronic graphics file annotations stored in the first header of the electronic graphics file.

10. The system of claim 9, wherein:
- the system comprises a database operable to store a plurality of annotations-searchable versions of electronic graphics files each having corresponding first and second headers and information corresponding to electronic graphics file annotations stored in the corresponding first headers; and
- the one or more processing units are operable to:
  - store the annotations-searchable version of the electronic graphics file the database;
  - receive a graphics file search request comprising one or more parameters; and
  - search the first headers of the annotations-searchable versions of the electronic graphics files stored in the database based on at least some of the one or more parameters.

11. The system of claim 10, wherein the searching is conducted using a standard electronic graphics query tool.

12. The system of claim 9, wherein the first header of the annotations-searchable version of the electronic graphics file is searchable using standard graphics query tools and the second header of the annotations-searchable version of the electronic graphics file is not searchable using standard graphics query tools.

13. The system of claim 9, wherein the one or more processing units are operable to extract the information corresponding to the electronic graphics file annotations by:
- extracting all information corresponding to electronic graphics file annotations from the second header of the electronic graphics file; and
- determining which of the information comprises text information.

14. The system of claim 9, wherein the one or more processing units are operable to store at least a portion of the extracted information corresponding to electronic graphics file annotations in the first header of the electronic graphics file to form a annotations-searchable version of the electronic graphics file comprises replacing the electronic graphics file.

15. A non-transitory computer-readable medium encoded with software for locating an electronic graphics file stored in a database, the software operable to perform operations comprising:
- extracting from an electronic graphics file, the electronic graphics file comprising a first and a second header, the first header of the electronic graphics file being searchable, information corresponding to electronic graphics file annotations stored in the second header of the electronic graphics file; and
- storing at least a portion of the extracted information corresponding to electronic graphics file annotations in the first header of the electronic graphics file to form an annotations-searchable version of the electronic graphics file, the annotations-searchable version of the electronic graphics file being searchable according to at least a portion of the information corresponding to electronic graphics file annotations stored in the first header of the electronic graphics file.

16. The non-transitory computer-readable medium of claim 15, wherein:
- the annotations-searchable version of the electronic graphics file is stored in a database storing a plurality of annotations-searchable versions of electronic graphics files each having corresponding first and second headers and information corresponding to electronic graphics file annotations stored in the corresponding first headers; and
- the operations comprise:
  - receiving a graphics file search request comprising one or more parameters; and
  - searching the first headers of the annotations-searchable versions of the electronic graphics files stored in the database based on at least some of the one or more parameters.

17. The non-transitory computer-readable medium of claim 16, wherein the searching is conducted using a standard electronic graphics query tool.

18. The non-transitory computer-readable medium of claim 15, wherein the first header of the annotations-searchable version of the electronic graphics file is searchable using standard graphics query tools and the second header of the annotations-searchable version of the electronic graphics file is not searchable using standard graphics query tools.

19. The non-transitory computer-readable medium of claim 15, wherein extracting the information corresponding to the electronic graphics file annotations comprises:

extracting all information corresponding to electronic graphics file annotations from the second header of the electronic graphics file; and determining which of the information comprises text information.

20. The non-transitory computer-readable medium of claim 15, wherein storing at least a portion of the extracted information corresponding to electronic graphics file annotations in the first header of the electronic graphics file to form a annotations-searchable version of the electronic graphics file comprises replacing the electronic graphics file.

* * * * *

UNITED STATES PATENT AND TRADEMARK OFFICE
CERTIFICATE OF CORRECTION

PATENT NO. : 8,156,133 B2
APPLICATION NO. : 12/353709
DATED : April 10, 2012
INVENTOR(S) : James E. Taber

Page 1 of 1

It is certified that error appears in the above-identified patent and that said Letters Patent is hereby corrected as shown below:

In column 6, line 16, delete "SOCETGXP" and insert -- SOCET GXP --, therefor.

In column 13, line 65, in Claim 10, delete "file" and insert -- file in --, therefor.

Signed and Sealed this
Tenth Day of July, 2012

David J. Kappos
*Director of the United States Patent and Trademark Office*